(12) United States Patent
Pett et al.

(10) Patent No.: US 11,248,968 B1
(45) Date of Patent: Feb. 15, 2022

(54) MICROWAVE RADIOMETER SYSTEMS AND METHODS WITH ELECTRO-OPTICAL CONVERSION IN PHOTONIC INTEGRATED CIRCUITS

(71) Applicant: Ball Aerospace & Technologies Corp., Boulder, CO (US)

(72) Inventors: Todd A. Pett, Longmont, CO (US); Jennifer H. Lee, Boulder, CO (US); Cynthia Wallace, Louisville, CO (US)

(73) Assignee: Ball Aerospace & Technologies Corp., Boulder, CO (US)

( * ) Notice: Subject to any disclaimer, the term of this patent is extended or adjusted under 35 U.S.C. 154(b) by 382 days.

(21) Appl. No.: 16/578,640

(22) Filed: Sep. 23, 2019

Related U.S. Application Data (60) Provisional application No. 62/735,269, filed on Sep. 24, 2018.

(51) Int. Cl.
*G01R 33/00* (2006.01)
*G01K 11/00* (2006.01)
*G01N 22/04* (2006.01)

(52) U.S. Cl.
CPC ........... *G01K 11/006* (2013.01); *G01N 22/04* (2013.01)

(58) Field of Classification Search
CPC ....... G01K 11/006; G01N 22/04; G01R 33/00
See application file for complete search history.

(56) References Cited

U.S. PATENT DOCUMENTS

| | | | |
|---|---|---|---|
| 5,724,043 A | 3/1998 | Savage et al. | |
| 7,353,690 B2 | 4/2008 | Solheim et al. | |
| 7,634,201 B2 | 12/2009 | Maleki et al. | |
| 7,724,179 B2 | 5/2010 | Williams et al. | |
| 8,331,008 B1 | 12/2012 | Matsko et al. | |
| 8,417,076 B2 | 4/2013 | Maleki et al. | |
| 8,761,555 B2 | 6/2014 | Matsko et al. | |

(Continued)

OTHER PUBLICATIONS

Hilliard et al. "Hyperspectral Microwave Atmospheric Sounder (HyMAS)—new capability in the CoSMIR/CoSSIR scanhead," NASA, Mar. 2015, 8 pages [retrieved online: ntrs.nasa.gov/search.jsp?R=20150002856].

(Continued)

*Primary Examiner* — Jermele M Hollington
*Assistant Examiner* — Taqi R Nasir
(74) *Attorney, Agent, or Firm* — Sheridan Ross P.C.

(57) ABSTRACT

Microwave radiometers (MRs) and methods for detecting microwave emissions using an electro-optical receiver that incorporates a photonic integrated circuit are provided. The electro-optical receiver includes an electro-optic modulator that modulates received radio frequency signals onto an optical carrier signal supplied by a pump laser. The resulting upconverted signal, containing the full spectrum of the radio frequency signals, is divided into channels by an optical filter. Each of the channels is connected to a corresponding photodetector, which produces an electrical output having an amplitude that is proportional to the amplitude of the received optical signal. The components included in the photonic integrated circuit can be formed on a single substrate. In addition, the optical filter can filter the received full spectrum optical signal into a large number of channels (e.g. greater than 50).

20 Claims, 7 Drawing Sheets

(56) References Cited

U.S. PATENT DOCUMENTS

| | | | |
|---|---|---|---|
| 9,002,207 B1 * | 4/2015 | Karras | H04B 10/11 |
| | | | 398/115 |
| 9,166,678 B1 | 10/2015 | Fish et al. | |
| 9,413,471 B2 | 8/2016 | Karras et al. | |
| 2014/0375335 A1 * | 12/2014 | Winso | G01N 29/04 |
| | | | 324/637 |
| 2019/0296831 A1 * | 9/2019 | Dillon | H04B 10/5165 |

OTHER PUBLICATIONS

Pett et al. "Photonics-based Microwave Radiometer Hyperspectral Earth Remote Sensing," 2018 International Topical Meeting on Microwave Photonics (MWP), 2018, 4 pages.

* cited by examiner

MICROWAVE RADIOMETER SYSTEMS AND METHODS WITH ELECTRO-OPTICAL CONVERSION IN PHOTONIC INTEGRATED CIRCUITS

CROSS-REFERENCE TO RELATED APPLICATIONS

This application claims the benefit of U.S. Provisional Patent Application Ser. No. 62/735,269, filed Sep. 24, 2018, the entire disclosure of which is hereby incorporated herein by reference.

FIELD

An electro-optical receiver monolithically integrated with photonic integrated circuits is provided.

BACKGROUND

Microwave radiometers (MRs) are sensitive receivers that measure small changes in the radiated power emanating naturally from the Earth's surface and atmosphere (i.e. blackbody radiation). Space-based MRs are important for atmospheric sounding (vertical profiling) and Earth surface imaging measurements necessary for generating a wide range of geophysical quantities. Sounding is the process where multi-frequency observations provide measurements at different altitudes to retrieve an altitude profile of a specific characteristic of the atmosphere. For example, retrievals of atmospheric temperature and humidity profiles are obtained routinely from space-based MRs using channels near the 60 GHz oxygen and 183 GHz water absorption features respectively.

Proven algorithms derive physical quantities from the raw power measurements made by a MR (e.g. atmospheric temperature, humidity, precipitation, wind vectors, sea surface temperature, etc.), which in turn feed weather and climate models. Conventional MRs include an antenna and a bandpass filter that selects the received input spectrum. The filtered input is amplified by a low noise amplifier (LNA), and mixed with a local oscillator to down-convert the signal to an intermediate frequency band (in some designs the bandpass filter is placed after the amplifier to improve measurement sensitivity). The resulting intermediate frequency signals are filtered into individual channels prior to detection, integration and analog to digital conversion. In conventional instruments, the size and weight of the MR electronics are driven in part by the dimensions of the filter banks required to enable multichannel operation, which are proportional to wavelength (typically in the centimeter to multi-millimeter microwave range). As a result, providing a MR capable of many channel operation is a particular challenge. Moreover, these constraints make the provision of hyperspectral sensors, which measure energy simultaneously in numerous channels over multiple frequency bands, providing a measurement capability that extends across a broad spectral range, at best impractical. In particular, while hyperspectral capabilities have been available in optical instruments, they have been unavailable in microwave instruments, due in part to the design complexity, size, weight, power and large quantities of components required to implement those capabilities at microwave frequencies.

In addition to the long-standing barriers to providing multiple channel operation in a practical instrument, the trend towards smaller, lower-cost spacecraft has made the design of a practical MR even more of a challenge. For example, mission cost reduction pressure is driving the re-evaluation of the entire weather observation architecture, and has resulted in the increased use of lower-cost spacecraft (e.g. CubeSats and SmallSats), which are being exploited individually and in constellations. These small-size options can only compete with the traditional large, more expensive systems, when sensors that meet small spacecraft integration volume constraints provide comparable or improved performance. Therefore, to fully realize the observation potential of the small platforms, sensor payloads, including MRs, must evolve to smaller cost, size, weight and power, while delivering the required performance.

SUMMARY

Microwave photonics provide a means to realize hyperspectral measurement capability at microwave frequencies within a small instrument volume. In a microwave photonic based radiometer, the microwave signal is converted into the optical domain to enable processing of the signal optically. Specifically, an electro-optical modulator modulates the incoming microwave signal onto a carrier provided by a pump laser. This process creates optical sidebands equally spaced from the laser carrier (e.g. a common telecom wavelength of 1550 nm, approximately 194 THz) by the modulating radio frequency center frequency (e.g. in the range of approximately 20-200 GHz). Each sideband contains the entire microwave input spectrum. Once in the optical domain, the microwave signals are processed with components fabricated into photonic integrated circuits (PICs) that are extremely small (compared to conventional microwave components), low loss, wideband, and immune to the effects of radio frequency interference.

Embodiments of the present disclosure provide a MR that includes an electro-optical receiver incorporating an electro-optic modulator that operates to up-convert received radio frequency (RF) signals to the optical domain. In addition, the electro-optic receiver features a number of components that are provided on a single silicon substrate. More particularly, in at least some embodiments, an electro-optical receiver is provided that includes photonic components that are monolithically integrated on a common silicon substrate. In accordance with still other embodiments, photonic components and electronics components are monolithically integrated on a common substrate.

Methods in accordance with embodiments of the present disclosure include receiving a radio frequency signal or signals at an antenna and band-pass filtering those signals. The filtered signals can then be amplified by a LNA. Next, the signals are up-converted to optical frequencies in an electro-optic modulator, which receives a carrier signal from a pump laser. The upconverted signals can then be filtered by an optical filter, and converted to an electrical signal using a photodetector. The electrical signal produced by the photodetector can then be amplified, integrated, and digitized by an amplifier, an integrator, and an analog to digital converter respectively. In accordance with embodiments of the present disclosure, the photonic components, such as the electro-optic modulator, the pump-laser, the optical filter, and the photodetector, are all implemented monolithically on a single silicon substrate. In accordance with further embodiments of the present disclosure, the electronic components, such as the amplifiers, the integrator, and the analog to digital converter, are also implemented monolithically on the single silicon substrate, together with the photonic components.

In at least some embodiments of the present disclosure, an electro-optic receiver that includes multiple channels can be provided. The multiple channels are defined by the optical filter, and each channel can be associated with a photodetector. In accordance with at least some further embodiments of the present disclosure, the electro-optic receiver can provide at least 50 channels. In accordance with still other embodiments, the electro-optic receiver can provide more than 100 channels.

Additional features and advantages of embodiments of the present disclosure will become more readily apparent from the following discussion, particularly when taken together with the accompanying drawings.

DETAILED DESCRIPTION

Figure 1:
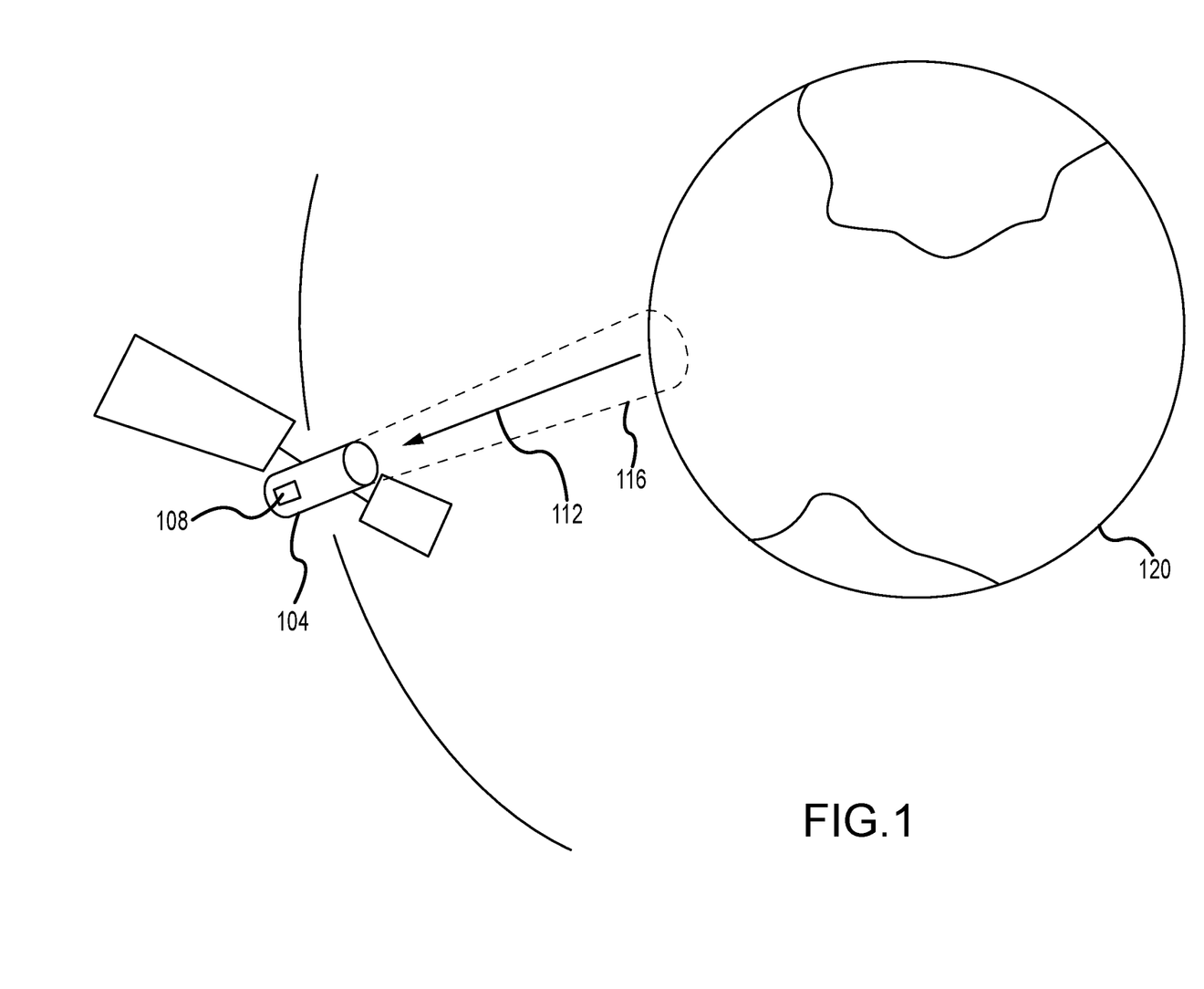
FIG. 1 depicts a scenario in which a MR incorporating an electro-optical receiver in accordance with embodiments of the present disclosure is operated to obtain measurements from the atmosphere.

FIG. 1 depicts a platform 104 carrying a MR 108 incorporating an electro-optical receiver in accordance with embodiments of the present disclosure. As used herein, a platform 104 can include, but is not limited to, a satellite, a manned spacecraft, an interplanetary spacecraft, an interstellar spacecraft, an orbiter, a lander, a missile, an aircraft, an unmanned aerial vehicle, a balloon, a stratospheric balloon, a terrestrial vehicle, a ship, a tower, or any other remote sensing platform or device to which a MR can be mounted or associated. In the illustrated example, the platform 104 is a satellite in orbit about the Earth 120. The platform 104 generally functions to position the MR 108 such that it can obtain measurements of microwave energy 112 from within a field of view 116 of the MR 108. The microwave energy 112 measured by the MR 108 can include energy emitted by molecules in the atmosphere or on the surface of the Earth 120, or from another planetary or celestial body, for use in geological surveying, weather forecasting, climate monitoring, or any other purpose. The MR 108 can also be used to measure microwave energy emitted by other objects or collections of matter, including but not limited to a structure, a body of water, an animal, or any other object, from within an operative field of view 116 of the MR 108. As an example, but without limitation, the MR 108 can measure energy within a range frequencies from 1000 MHz to 1000 GHz. Moreover, a MR 108 incorporating an electro-optical receiver in accordance with embodiments of the present disclosure can support multiple channels that obtain energy measurements within different frequency ranges simultaneously. A MR 108 incorporating an electro-optical receiver in accordance with further embodiments of the present disclosure can provide hyperspectral capabilities (e.g. >50 channels).

Figure 2:
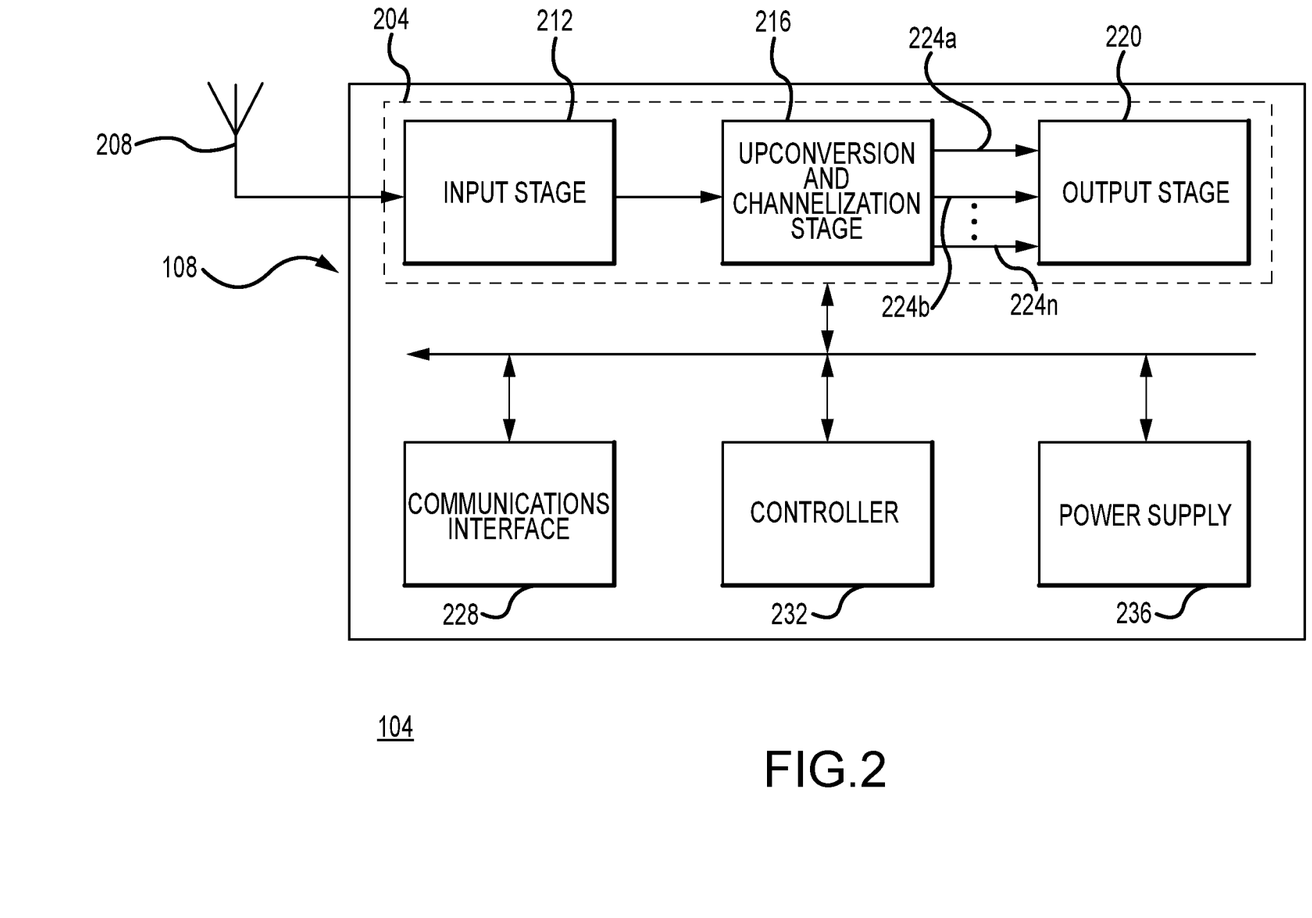
FIG. 2 depicts components of a MR incorporating an electro-optical receiver in accordance with embodiments of the present disclosure.

FIG. 2 depicts components of a platform 104 and an associated MR 108 incorporating an electro-optical receiver 204 in accordance with embodiments of the present disclosure. In general, the MR 108 includes an antenna 208 that provides received microwave signals to the electro-optical receiver 204. As can be appreciated by one of skill in the art after consideration of the present disclosure, the field of view 116 of the MR 108 can be defined by the configuration and properties of the antenna 208. Moreover, although referred to herein in the singular, it should be appreciated that more than one antenna or antenna structure 208 may be included as part of the MR 108. For example, different antenna 208 structures may be provided to receive energy 112 at different frequencies. As another example, different antenna 208 structures may be provided to receive radiofrequency energy 112 at different included angles relative to the MR 108 to provide a desired field of view 116.

The electro-optical receiver 204 generally includes an input stage 212, an upconversion and channelization stage 216, and an output stage 220. As discussed in greater detail elsewhere herein, the input stage 212 generally functions to select (via bandpass filtering) and amplify radiofrequency signals received by the antenna 208. The upconversion and channelization stage 216 receives the radiofrequency signals that have been filtered and amplified by the input stage 212, and upconverts those signals to the optical domain. In addition, the upconversion and channelization stage 216 divides the upconverted signal into a plurality of channels, with each optical channel covering a different range of RF frequencies. The upconversion and channelization stage 216 can further operate to convert the optical signals in each optical channel to an electrical signal that is provided to a corresponding electrical channel 224. In accordance with the least some embodiments of the present disclosure, the electro-optical receiver 204 supports n optical and n electrical 224 channels, where n is greater than 50. The output stage 220 receives each of the electrical channels 224, and provides a digital output representing an amplitude of the signal included in each channel 224.

In addition, a communications interface 228, controller 232, and a power supply 236, provided as part of the MR 108 itself, and/or the platform 104, can be associated with the MR 108. In general, the communications interface 228 can operate to transmit and receive communications passed between the platform 104 and other platforms, nodes, or control centers. For example, the communication interface 228 can receive control instructions, and can transmit data collected by the MR 108. In accordance with at least some embodiments of the present disclosure, the communications interface 228 may support communications over a wireless link. In accordance with other embodiments of the present disclosure, the communications interface 228 may support radio frequency or laser link communications. The controller 232 can incorporate one or more processors, memory units, and/or data storage units, and can execute application programming or instructions for the operation of the MR 108, the platform 104, and/or associated assemblies or devices. In addition, the controller 232 can operate in cooperation with the communications interface 228 to receive and act on instructions received from a control center, to pass the data collected by the MR 108 in real-time, near real-time, or periodically, and can otherwise control operation of the platform 104, the MR 108, and other instruments or assemblies. The power supply 236 provide power for operation of the MR 108, or the MR 108 and the platform 104. The power supply 236 can include one or more devices or systems of the same or different types, including but not limited to batteries, fuel cells, solar panels, or the like.

Figure 3:
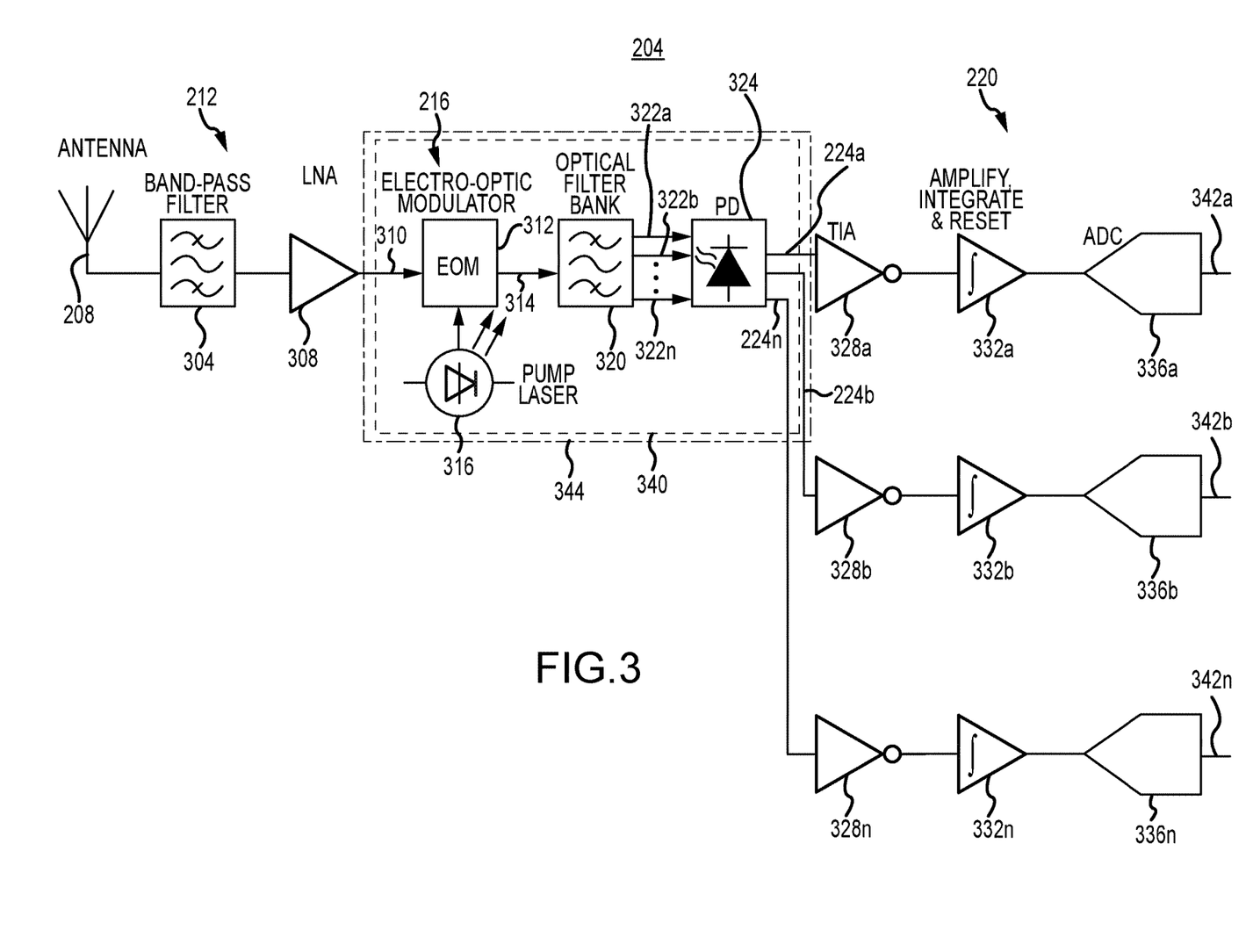
FIG. 3 is a diagram depicting components of an electro-optical receiver in accordance with embodiments of the present disclosure.

FIG. 3 is a diagram depicting components of an electro-optical receiver 204 in accordance with embodiments of the present disclosure. In general, the input stage 212 of the electro-optical receiver 204 is connected to the antenna 208 of the MR 108. The input stage 212 can include a bandpass filter 304 and a LNA 308. The antenna 208 and bandpass filter 304 can be implemented using conventional MR components. Moreover, the antenna 208 and bandpass filter 304 can be configured to receive and isolate signals within a received spectrum of signals having frequencies of interest, such as frequencies corresponding to absorption features of atmospheric constituents or geophysical phenomena. Signals passed to the bandpass filter 304 by the antenna 208 that fall within the passband of the filter 304 are received at the LNA 308, which provides a filtered and amplified signal to the upconversion and channelization stage 216.

The upconversion and channelization stage 216 generally includes an electro-optic modulator 312, a pump laser 316, an optical filter bank 320, and one or more photodetectors 324. More particularly, the amplified RF signal 310 from the input stage 212 is input to the electro-optic modulator 312, which upconverts the full spectrum of the input radio frequency signals onto an optical frequency carrier signal provided by the pump laser 316. As can be appreciated by one of skill in the art after consideration of the present disclosure, the input radio frequency signals are upconverted into sidebands in the optical domain, enabling processing of the input signals using integrated photonic circuits. The upconverted signals 314 are then passed through the optical filters of the optical filter bank 320. The optical filters included in the optical filter bank 320 can, for example, remove one of the two sidebands produced during the upconversion process. The resulting filtered optical signals 322 can then be provided to photodetectors 324 for conversion to an electrical signal. As an example, the photodetectors 324 can each comprise a photodiode. As a further example, the photodetectors 324 can be implemented as a bank of photodiodes. Accordingly, each optical channel is associated with a filter 320 and a photodetector 324.

Therefore, in accordance with the least some embodiments of the present disclosure, the optical filter 320 divides one of the sidebands output by the electro-optic modulator 312 into a plurality of optical channels or bands 322a-n. In such embodiments, the electro-optical receiver 204 includes a plurality of photodetectors 324, with at least one photodetector 324 provided for each optical channel 322 defined by the optical filter 320. As a result of the upconversion to optical frequencies, the various structures of the optical filter 320 can be made much smaller than a corresponding microwave structure having the same number of filter channels of the same number of orders. Accordingly, embodiments of the present disclosure can provide electro-optical receivers 204 with multiple channel capabilities, including hyperspectral capabilities, that can be incorporated into CubeSats or other platforms 104 in which the inclusion of relatively small and lightweight instruments is advantageous. In accordance with at least some embodiments of the present disclosure, at least 50 channels are provided by the optical filter 320. In accordance with further embodiments of the present disclosure, more than 100 channels are provided by the optical filter 320.

Each photodetector 324 outputs an electrical signal that is proportional to the amplitude of the optical signal received at the photodetector 324. The output from the photodetectors 324 is passed to the output stage 220. In accordance with embodiments of the present disclosure, the output stage 220 operates to produce a digital output for each signal received from the upconversion and channelization stage 216. In at least some embodiments, the output stage 220 can include an amplifier 328, such as a trans-impedance amplifier, an integrating circuit 332, and an analog to digital converter 336. Where multiple channels are output by the optical filter 320, a photodetector 324, amplifier 328, integrator 332, and analog-to-digital converter 336 can be provided for each of the channels. Accordingly, for an electro-optical receiver 204 having n channels, photodetectors 324, amplifiers 328, and integrators 332, n analog-to-digital converters 336 can be included in the output stage 220.

In accordance with embodiments of the present disclosure, the electro-optic modulator 312, the pump laser 316, the optical filter 320, and the photodetector 324 are implemented as a photonic integrated circuit (PIC) 340. In accordance with at least some embodiments of the present disclosure, some or all of the electro-optic modulator 312, the pump laser 316, the optical filter 320, the photodetector 324 and any other components included in the photonic integrated circuit 340 are implemented on a single substrate 344. In at least some embodiments the single substrate 344 can be a silicon substrate. In accordance with further embodiments of the present disclosure, some or all of the electro-optic modulator 312, the pump laser 316, the optical filter 320, the photodetector 324 and any other components included in the photonic integrated circuit 340 are implemented monolithically on a single substrate 344.

Figure 4:
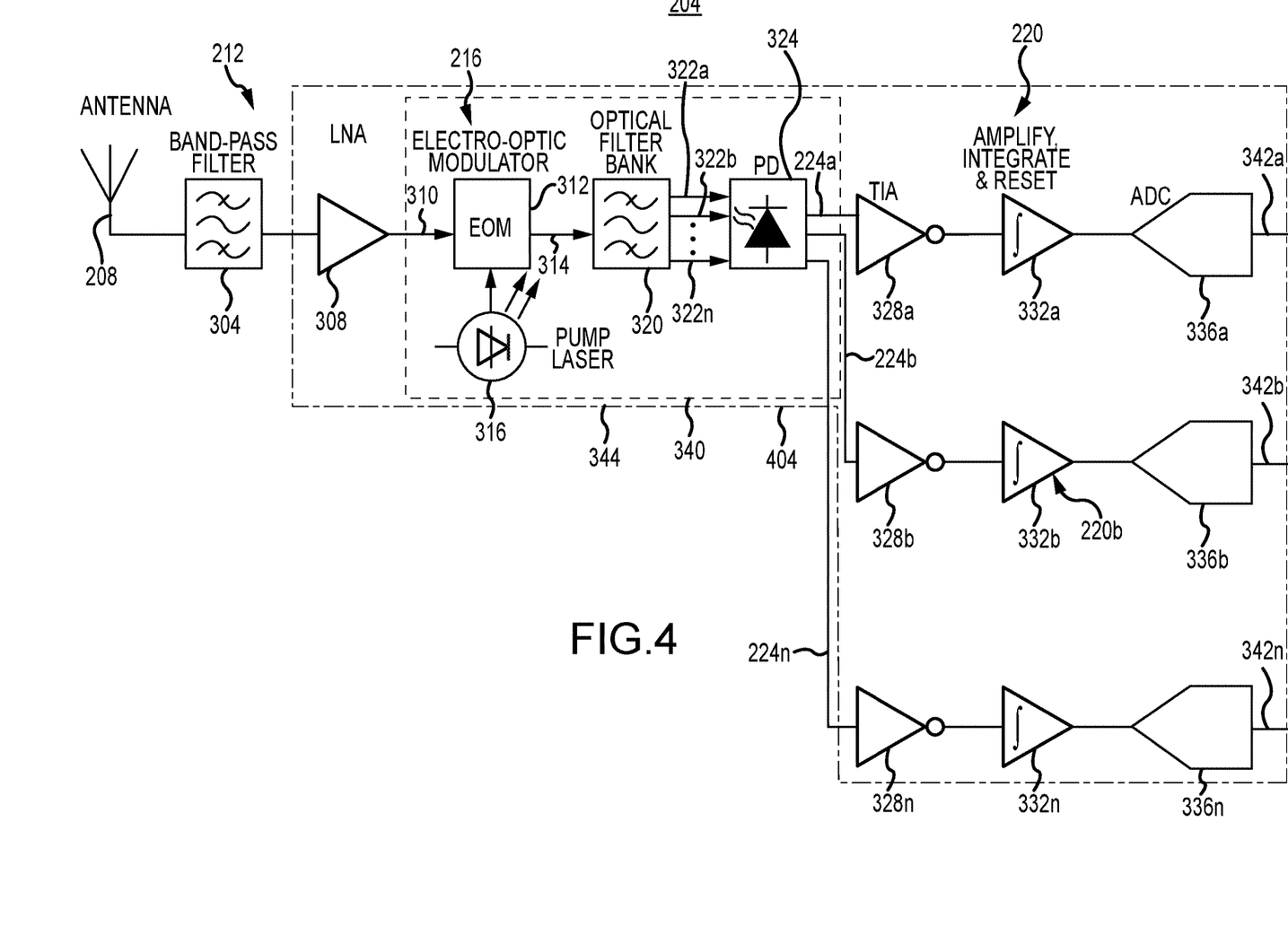
FIG. 4 is a diagram depicting components of an electro-optical receiver in accordance with other embodiments of the present disclosure.

FIG. 4 is a diagram depicting components of an electro-optical receiver 204 in accordance with other embodiments of the present disclosure. The embodiment illustrated in FIG. 4 differs from the embodiment illustrated in FIG. 3 in that the LNA 308, the components of the upconversion and channelization stage 216, and the components of the output stage 220 are all formed on a single substrate 404. In accordance with the least some embodiments, the electronic components, such as the amplifiers 308 and 328, integrators 332, and analog-to-digital converters 336, are all fabricated as complementary metal oxide semiconductor (CMOS) components on the single substrate 404. In accordance with still further embodiments, the pump laser 316, the optical filter 320, and the photodetectors 324 are also fabricated as CMOS components on the single substrate 404. Accordingly, the components of the photonic integrated circuit 340 can be formed on the same substrate 404 as other components of the electro-optical receiver 204. In accordance with further embodiments of the present disclosure, some or all of LNA 308, the electro-optic modulator 312, the pump laser 316, the optical filter 320, the photodetector 324, the amplifiers 308 and 328, integrators 332, and analog-to-digital converters 336 are implemented monolithically on a single substrate 344.

For use in connection with various applications, including atmospheric temperature sounding applications, a MR 108 requires narrowly defined channels. Such channels in turn require high order filters (e.g. four or more). Moreover, for a hyperspectral instrument, a large number of closely-spaced channels defined using high order filters are required. As can be appreciated by one of skill in the art after consideration of the present disclosure, the size and weight of MR 108 components are driven in part by the dimensions of the filter banks, which are proportional to wavelength, required to enable hyperspectral operation. Accordingly, a typical microwave filter fabricated on a printed circuit board requires approximately 14 cm² for nine channels, and has a relatively high insertion loss on the order of 16 dB. In accordance with embodiments of the present disclosure, the received signals are upconverted to an optical wavelength that is 3 to 4 orders of magnitude smaller than the microwave wavelength. As a result, the photonic integrated circuit based optical filters 320 can be implemented in a much smaller area. For example, photonic integrated circuit based optical filters 320 in accordance with embodiments of the present disclosure can be designed to occupy an area that is approximately 150 times smaller than their microwave counterparts, can produce lower insertion loss, and can integrate on the same substrate with other MR components using silicon on insulator (SOI) silicon photonic or even standard CMOS fabrication processes. Accordingly, embodiments of the present disclosure can include a single silicon substrate 344 or 404 on which components, such as the LNA 308, the transimpedance amplifier 328, the integrator 332, and the analog-to-digital converter 336, and photonic integrated circuit 340 components, such as the electro-optic modulator 312, the pump laser 316, the optical filter 320, and the photodetectors 324, are implemented on a common substrate. For example, various components can be formed on a silicon substrate directly, while other components, such as the pump laser 316, can be formed in or on other materials that are grown on the silicon substrate. In accordance with further embodiments of the present disclosure, various components, such as the LNA 308, the transimpedance amplifier 328, the integrator 332, and the analog-to-digital converter 336, and photonic integrated circuit 340 components, such as the electro-optic modulator 312, the pump laser 316, the optical filter 320, and the photodetectors 324, are implemented on a single silicon substrate monolithically.

Figure 5:
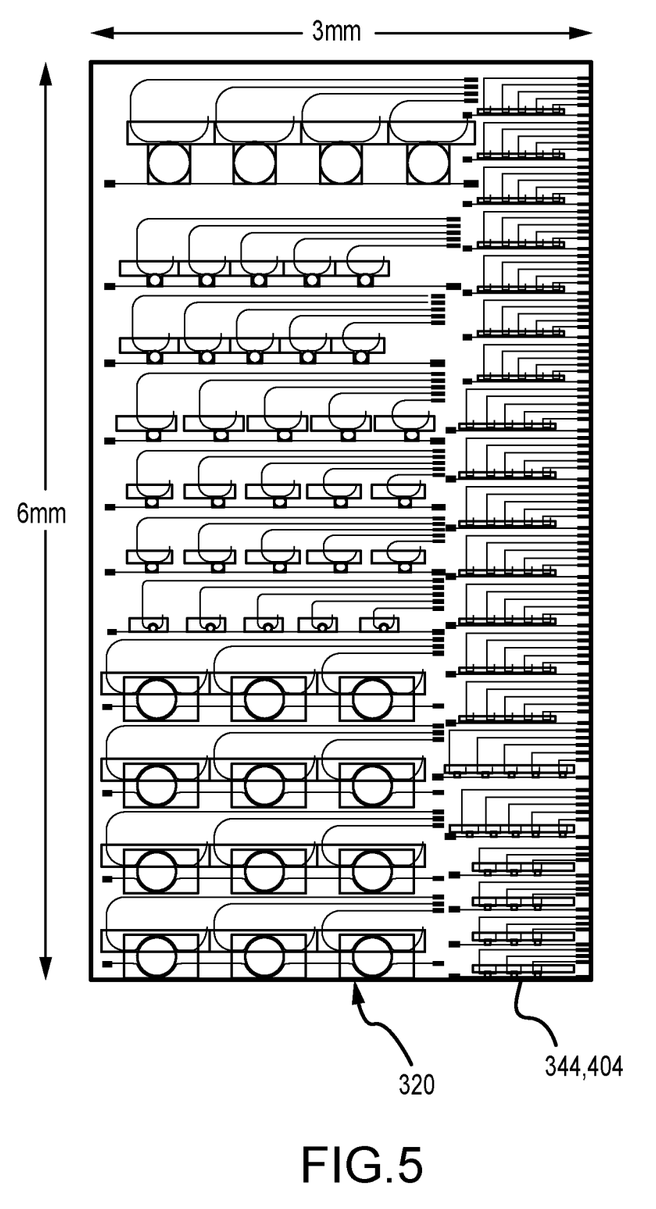
FIG. 5 depicts a layout of a silicon photonic integrated circuit in accordance with embodiments of the present disclosure.
Figure 6:
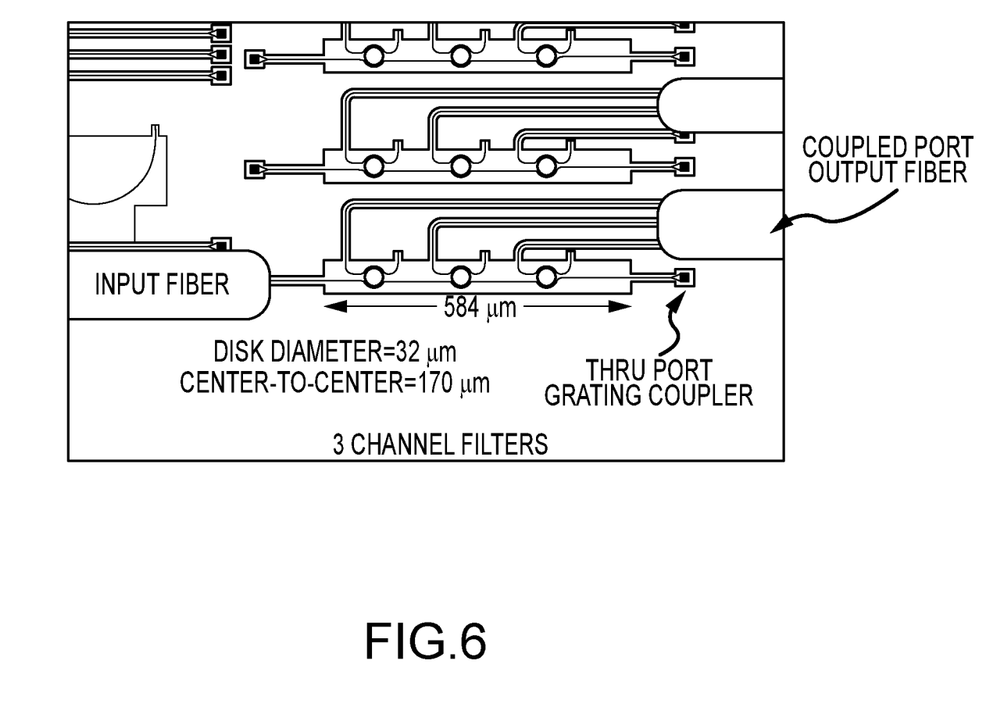
FIG. 6 depicts a portion of a silicon photonic integrated circuit in accordance with embodiments of the present disclosure.

FIG. 5 depicts an example of a layout of optical filter 320 components of a photonic integrated circuit 340 in accordance with embodiments of the present disclosure. In this example the optical filter 320 of the photonic integrated circuit 340 includes high-Q ring and disk resonators fabricated on a silicon substrate 344 or 404 to provide narrow channel bandwidth (e.g. ≥100 MHz) and channel spacing (e.g. 1 to 4 GHz) required to match conventional MR filters. The example photonic integrated circuit 340 layout shown in FIG. 5 contains nearly 150 single pole filters. Moreover, the photonic integrated circuit 340 can be implemented on a silicon substrate 344 or 404 that is shared with other components of the electro-optic receiver 204. FIG. 6 is a photograph of several 3-channel filters of a silicon photonic integrated circuit 340 in accordance with embodiments of the present disclosure.

Figure 7:
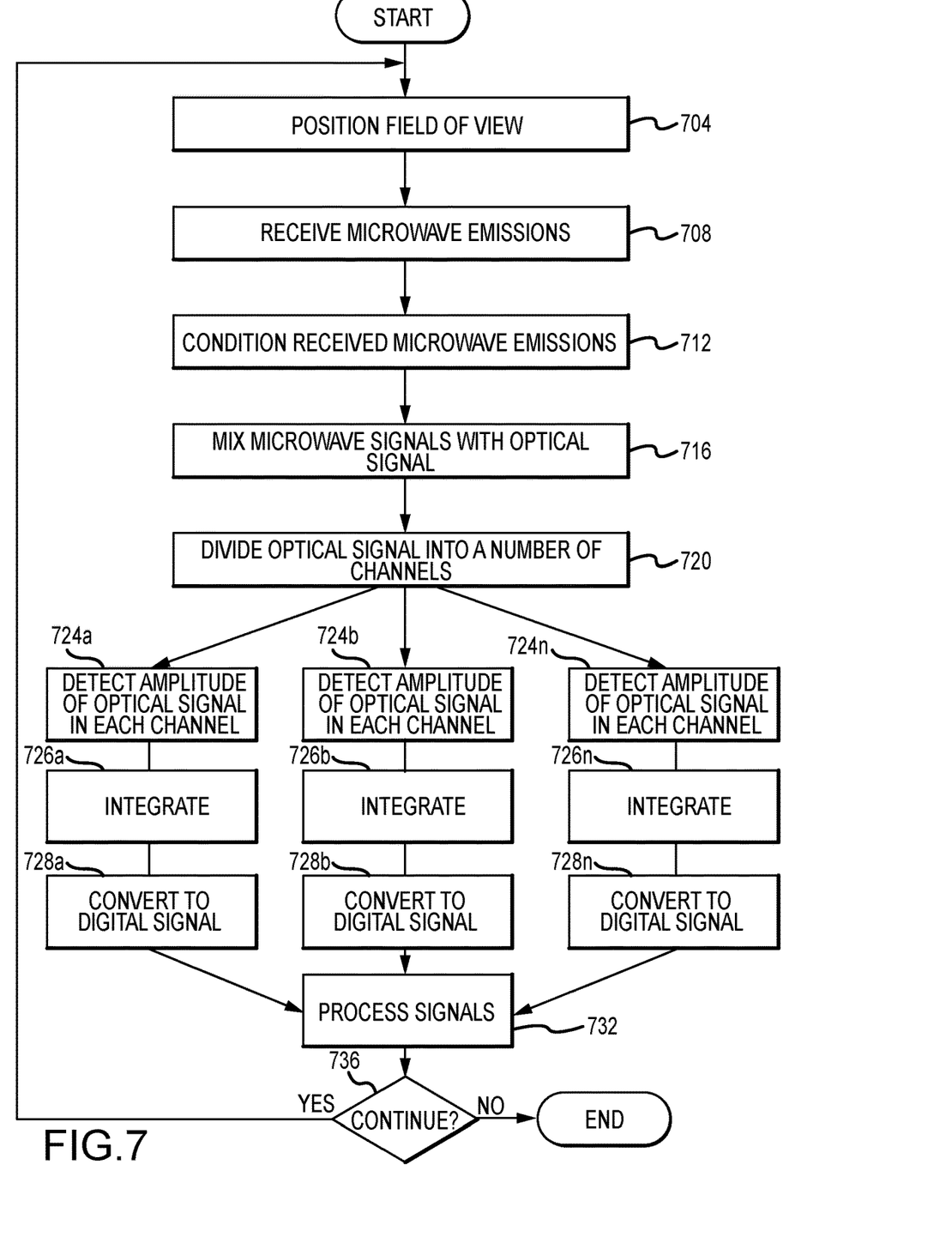
FIG. 7 is a flowchart depicting aspects of a method for sensing microwave energy in accordance with embodiments of the present disclosure.

FIG. 7 is a flowchart depicting aspects of a method for sensing microwave energy in accordance with embodiments of the present disclosure. Initially, at step 704, the field of view 116 of a MR 108 is positioned to encompass a desired volume of an atmosphere surrounding a planetary body, area of a planetary body, or area of another body from which microwave emissions 112 are to be collected. As an example, but without limitation, the field of view 116 of the radiometer 108 can be directed to encompass a volume of the Earth's atmosphere from which temperature, humidity, and/or other meteorological sounding data is desired. Next, radio frequency emissions 112, and in particular microwave frequency emissions, are collected or received at an antenna 208 of the MR 108 (step 708).

The collected microwave emissions are then conditioned (step 712). The conditioning can include filtering by a bandpass filter 304, and amplification by a LNA 308. The conditioned microwave signal is mixed with an optical carrier signal to create an optical signal (step 716). In accordance with embodiments of the present disclosure the mixing is performed by an electro-optic modulator 312 provided as part of a photonic integrated circuit 340. Moreover, the electro-optic modulator 312 can receive an optical frequency carrier signal from a pump laser 316, also provided as part of the photonic integrated circuit 340. The optical signal is then divided into a plurality of optical channels or bands 322 (step 720). The division of the optical signal into a plurality of optical channels 322 can be performed by an optical filter 320 that is provided as part of the photonic integrated circuit 340. In accordance with at least some embodiments of the present disclosure, the different optical channels 322 can be defined by high order filters implemented by the optical filter 320.

At step 724a-n, the amplitude of an optical signal in each of the optical channels 322 is detected. In accordance with embodiments of the present disclosure, the detection of the optical signal in each of the optical channels 322 is performed by a photodetector 324, such as a photodiode, provided for each of the optical channels 322. Accordingly, the detection of the amplitude in each optical channel can be performed simultaneously, as a number of parallel processes. Each photodetector 324 can provide a DC voltage having an amplitude that is proportional to the amplitude of the detected optical signal in the associated optical channel 322 as an output that is placed on a corresponding electrical channel 224. The electrical signal on each electrical channel 224 is then integrated over a time period determined by the operational environment (step 726a-n), and is then converted to a digital output signal 342 (step 728a-n). Digitization of the electrical signal can be performed using analog-to-digital converters 336. The digital output signals 342 can then be processed to convert the obtained amplitude data corresponding to different microwave frequencies to measurements of physical parameters (step 732). The processing of the digital output signals 342 can be performed by a controller 232 carried by the platform 104 carrying the MR 108, or by a remote processing system that is provided with the digital output signals 342 via a communication interface 228.

At step 736, a determination can be made as to whether continued operation is desired. If continued operation is desired the process can return to step 704. Alternatively, the process can end.

Accordingly various embodiments of an electro-optical receiver 204 that includes a photonic integrated circuit 340 have been described. In accordance with at least some embodiments, the components of the photonic integrated circuit 340 are formed on a single silicon substrate 344. Moreover, embodiments incorporating a photonic integrated circuit 340 and electronic components implemented in CMOS that are formed on a single semiconductor substrate 404 have been described. As can be appreciated by one of skill in the art after consideration of the present disclosure, although various embodiments of an electro-optical receiver 204 in which a photonic integrated circuit 340 is implemented on a single silicon substrate, alone or further integrated with electronic components formed on the single silicon substrate, in order to provide a MR, embodiments of the present disclosure are not so limited. For example, embodiments of the present disclosure can be used in communications antennas, including phased array systems, or any other radio frequency system.

In accordance with further embodiments the present disclosure, multiple electro-optical receivers 204 can be operated in parallel as part of a single MR 108. In such embodiments, different electro-optical receivers 204 can be configured to cover different frequency bands. Accordingly, different electro-optical receivers 204 provided as part of a single MR 108 can be associated with different outputs of a bandpass filter 304, or different bandpass filters 304. The use of multiple electro-optical receivers 204 as described herein in parallel can facilitate very wideband coverage (e.g. 300 MHz-1000 GHz). In accordance with still further embodiments of the present disclosure, different electro-optical receivers 204 can be associated with different antennas 208. The provision of multiple electro-optical receivers 204 is facilitated by embodiments of the present disclosure, which provide some or all of the associated components on a single or common substrate 304 or 404, because of the ability to implement various components as part of one or more photonic integrated circuits 340.

The foregoing description has been presented for purposes of illustration and description. Further, the description is not intended to limit the disclosed systems and methods to the forms disclosed herein. Consequently, variations and modifications commensurate with the above teachings, within the skill or knowledge of the relevant art, are within the scope of the present disclosure. The embodiments described hereinabove are further intended to explain the best mode presently known of practicing the disclosed systems and methods, and to enable others skilled in the art to utilize the disclosed systems and methods in such or in other embodiments and with various modifications required by the particular application or use. It is intended that the appended claims be construed to include alternative embodiments to the extent permitted by the prior art.

What is claimed is:

1. A microwave radiometer, comprising:
    an antenna;
    a electro-optical receiver, including:
        a bandpass filter, wherein an output of the antenna is connected to an input of the bandpass filter;
        a substrate, including:
            an electro-optic modulator, wherein an output of the bandpass filter is connected to a radio-frequency input of the electro-optic modulator;
            an optical filter, wherein an output of the electro-optic modulator is connected to an input of the optical filter; and
            a photodetector, wherein an output of the optical filter is connected to an input to the photodetector.

2. The microwave radiometer of claim 1, further comprising:
    a pump laser, wherein an output of the pump laser is connected to an optical input of the electro-optic modulator, and wherein the electro-optic modulator outputs an optical signal.

3. The microwave radiometer of claim 2, wherein the optical filter separates the optical signal received from the electro-optic modulator into a plurality of optical channels.

4. The microwave radiometer of claim 3, wherein the substrate further includes a plurality of photodetectors, and wherein each optical channel defined by the optical filter is connected to a different photodetector included in the plurality of photodetectors.

5. The microwave radiometer of claim 4, further comprising:
    a plurality of output amplifiers, wherein an output of each photodetector in the plurality of photodetectors is connected to an input of a different output amplifier included in the plurality of output amplifiers; and
    a plurality of analog to digital converters, wherein an output of each output amplifier in the plurality of output amplifiers is connected to an input of a different analog to digital converter included in the plurality of analog to digital converters.

6. The microwave radiometer of claim 5, further comprising:
    a plurality of integrators, wherein for each output amplifier in the plurality of output amplifiers a different integrator receives an input and provides an integrated output to the analog to one of the analog to digital converters.

7. The microwave radiometer of claim 6, further comprising:
    an input amplifier, wherein the input amplifier receives an input from the band-pass filter and provides an output to the electro-optic modulator.

8. The microwave radiometer of claim 2, wherein the substrate further includes the pump laser.

9. The microwave radiometer of claim 5, wherein the substrate further includes the pump laser, the plurality of output amplifiers, and the plurality of analog to digital converters.

10. The microwave radiometer of claim 7, wherein the substrate further includes the pump laser, the plurality of output amplifiers, the plurality of integrators, the plurality of analog to digital converters, and the input amplifier.

11. The microwave radiometer of claim 7, wherein the input amplifier, the electro-optic modulator, the pump laser, the optical filter, the photodetectors, the output amplifiers, the plurality of integrators, and the analog to digital converters are implemented using complementary metal-oxide semiconductor (CMOS) processes.

12. The microwave radiometer of claim 10, wherein the optical filter outputs at least 100 channels.

13. The microwave radiometer of claim 2, wherein the electro-optic modulator, the pump laser, the optical filter, and the photodetector are implemented using complementary metal-oxide semiconductor (CMOS) processes.

14. A method for processing a microwave signal, comprising:
    receiving a microwave signal;
    mixing the received microwave signal with an optical carrier signal to create an optical signal;
    separating the optical signal into a plurality of channels; and
    detecting the optical signal in each channel using a photodetector, wherein at least one photodetector is provided for each of the channels.

15. The method of claim 14, wherein the mixing, separating, and detecting steps are performed using components formed on a single silicon substrate.

16. The method of claim 15, wherein at least some of the components formed on the single silicon substrate are formed using a complementary metal oxide semiconductor (CMOS) fabrication process.

17. The method of claim 14, further comprising:
    wherein detecting the optical signal includes, for each channel, outputting a direct current signal from the photodetector associated with the channel.

18. The method of claim 14, wherein the optical signal is separated into at least 100 channels.

19. An electro-optical receiver, comprising:
- an electro-optic modulator, including a radio frequency input and an optical carrier signal input;
- a pump laser, wherein the pump laser provides an optical carrier signal to the optical carrier signal input of the electro-optic modulator;
- an optical filter, wherein the optical filter divides an optical signal received from the electro-optic modulator into a plurality of channels; and
- a plurality of photodetectors, wherein each of the channels is connected to a corresponding one of the photodetectors.

20. The electro-optic receiver of claim 19, wherein the electro optic modulator, the pump laser, the optical filter, and the plurality of photodetectors are formed on a single silicon substrate.

\* \* \* \* \*